Jan. 23, 1968 D. H. SMITH ETAL 3,365,290
MAGNETIC MEMORY ELEMENT UTILIZING COMPOSITION COMPRISING Ni-Fe-Sn-Ag
Filed May 24, 1965
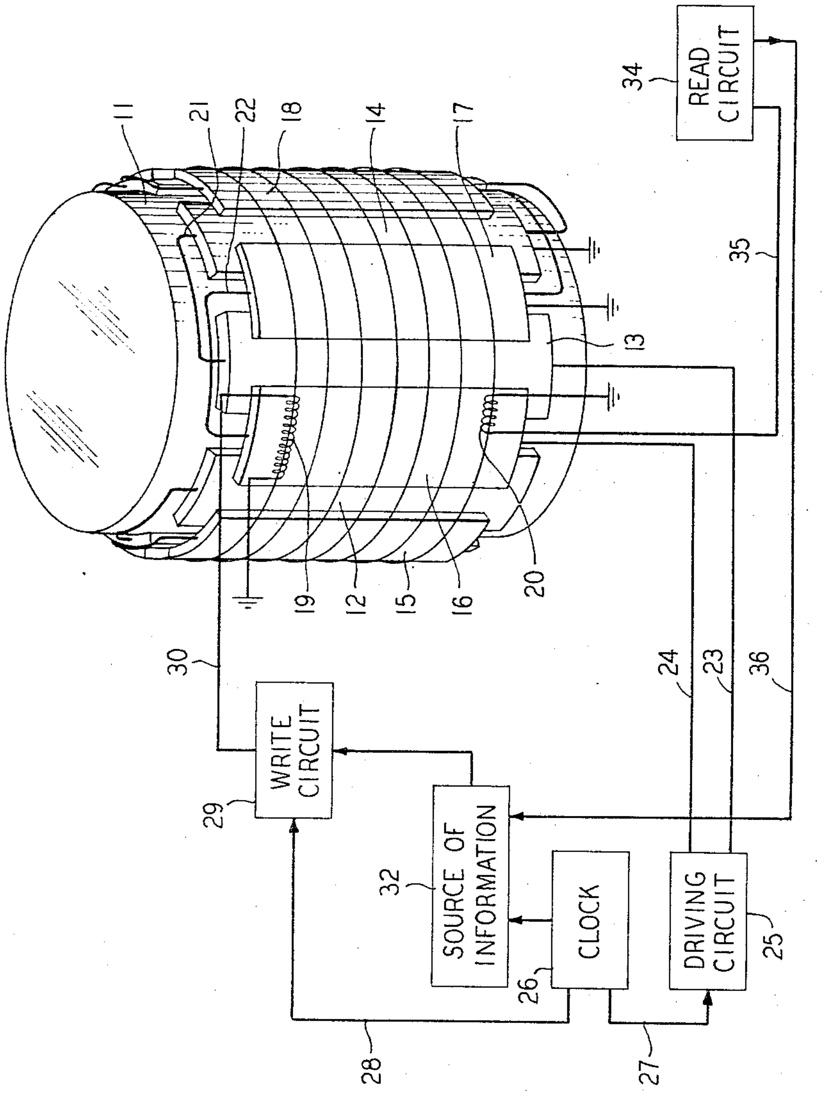
INVENTORS D. H. SMITH
E. M. TOLMAN
BY Edward M. Fink
ATTORNEY United States Patent Office 3,365,290

Patented Jan. 23, 1968

3,365,290

MAGNETIC MEMORY ELEMENT UTILIZING COMPOSITION COMPRISING Ni-Fe-Sn-Ag

David H. Smith, Summit, N.J., and Edward M. Tolman, New York, N.Y., assignors to Bell Telephone Laboratories, Incorporated, New York, N.Y., a corporation of New York Filed May 24, 1965, Ser. No. 458,140
3 Claims. (Cl. 75—170)

ABSTRACT OF THE DISCLOSURE

A magnetic memory element capable of shifting magnetic domain walls without the application of tension includes silver, tin, nickel, iron, and optionally molybdenum.

This invention relates to magnetic information retaining devices and to a novel magnetic medium for use therein. More particularly, the present invention relates to a device for storing magnetic informational domains within elongated magnetic media comprising nickel, iron, silver, tin and optionally, molybdenum.

Electrical information handling circuits employing individual memory elements of a material having substantially nonlinear characteristics whereby the memory elements are enabled to remain in either of two stable states are well known. Such circuits are extensively represented in the art in numerous forms and may advantageously employ memory elements of a ferromagnetic material.

One well known information handling circuit in which ferromagnetic memory elements may be employed is a shift register circuit. In such a circuit, binary information may be introduced at one point and temporarily stored or delayed by shifting it along successive information addresses to another point in the circuit by utilizing the principle of establishing and shifting magnetic domains of selected polarities through a magnetic medium.

Memory structures of this type are generally divided into a plurality of individually polarizable discrete segments, having an interaction therebetween; with a predetermined number of such segments making up each of the information addresses Initially, the segments of each of the addresses are polarized in the same direction. An information bit such as a binary "1," for example, is introduced into a first address of the memory structure by reversing all of the segments of that address to the opposite direction, thereby establishing a pair of domain walls that can be moved continually along the magnetic medium which comprises the sum of the discrete segments.

Movement of the domain walls and shifting of the information bit along the memory element is accomplished by simultaneously restoring the first segment of the instant address to its initial polarization and reversing the polarization of the next segment following the last segment of the instant address. A new alignment of segments and propagation of the domain walls results and the information address has in this manner been shifted one segment portion. As an information bit is shifted along the memory element in successive phases of operation, the bit occupies a succession of overlapping or adjacent bit addresses. When the last address position of the memory element is reached, the information bit may be read out by detecting a flux change in the final segment due to the presence of the domain walls in that address. If a binary "1," for example, has been shifted to that position, each of the segments in the last address will be reversed relative to the initial polarization and this reversal of polarization may be detected as a readout signal by means well known in the art.

In general, shifting of magnetic domain walls separating two regions of opposing magnetization in a magnetic medium may be accomplished by applying a control magnetic field, H, parallel to the magnetization of that region which it is desired to expand by applying current pulses to a suitable propagation coil. The axial velocity of the resultant domain wall is proportional to $(H-H_c)$ wherein $H_c$ is the critical field below which propagation of the wall will not occur, the value of H being less than $H_n$, the axial magnetic field necessary to nucleate a reversed magnetization section in the magnetic medium. Devices of the described type will operate with any magnetic medium evidencing a ratio of $H_n/H_c$ greater than one. Unfortunately, none of the known magnetic media evidence $H_n/H_c$ ratio greater than one unless maintained under tension, generally within 50 percent of their yield point. Accordingly, device fabrication is a costly and complicated procedure for which workers in the art have long sought a remedy.

In accordance with the present invention there is herein described a novel magnetic medium manifesting a ratio of $H_n/H_c$ substantially greater than one without the application of tension, such medium being of particular interest for use in shift registers of the described type. The described medium comprises from 0.25–2.0 percent, by weight, tin, 0.5–2.0 percent, by weight, silver, 0.0–5.0 percent, by weight, molybdenum, 72.0–80.0 percent, by weight, nickel, remainder iron, wherein the ratio of nickel to iron is within the approximate range of from 3:1 to 7:1. The squareness ratio of the described compositions ranges to 0.9 and higher and the materials herein are otherwise such as to suggest their general use in memory elements.

The invention has been described largely in terms of a magnetic shift register utilizing the described composition. However, it will be understood that the magnetic shift register alluded to herein is intended to be exemplary of a significant use of the novel compositions. It is further to be understood that the described composition may be used in the formation of magnetic memory elements based on principles of operation different than those of the noted shift register and it will be appreciated that any magnetic device or structure which requires magnetic elements displaying a substantially rectangular hysteresis characteristic may be fabricated with the described composition.

The invention will be more readily understood by reference to the following detailed description taken in conjunction with the accompanying drawing wherein:

The figure depicts an exemplary shift register utilizing a magnetic medium of the present invention.

With reference now more particularly to FIG. 1, there is shown an exemplary magnetic shift register utilizing the composition described herein as a magnetic medium. Shown in the figure is a nonconductive mounting cylinder 11 having disposed thereon two overlapping groups of evenly spaced conductors parallel to the longitudinal axis of cylinder 11, such forming the polyphase conductor array. The lower or underlying portion of the conductor array comprises a plurality of flat rectangular members, for example, 12, 13 and 14, which are partially covered by the upper layer comprising rectangular shaped members 15, 16 and 17. As shown in the figure, the conductors are curved to conform to the circular configuration of the structural cylinder 11.

Immediately adjacent to the conductor array there is shown a magnetic wire 18 wound in a helix about cylinder 11 and comprising the composition described herein.

In the system being described utilizing magnetic wire 18 for each shift register channel, the recording is performed by establishing a pair of domain walls of like polarity by a write coil 19 that can be moved along continuously from one bit address to another and sensing is performed by detecting a flux change in the final segment of the wire due to the presence of the domain walls by read coil 20.

In the driving system described herein utilizing a plurality of polyphase conductors to provide a continuous circular driving field, conductors 13 and 14 and conductors 16 and 17 are connected together through leads 21 and 22, respectively, at one end. At the other end, conductors 13 and 16 are shown connected through leads 23 and 24, respectively, to a driving circuit 25 and conductors 14 and 17 are connected to ground. The described system also employs a clock 26 to provide timing through lead 27 to the driving circuit and through lead 28 to the write circuit 29 which is connected to write coil 19 by lead 30, the other end of coil 19 being connected to ground. Information is applied to the system from a source of information 32 through lead 33 to the write circuit 29, the source of information being timed by clock 26. The read circuit 34 is connected to read coil 20 by lead 35, the other end of coil 20 being connected to ground. Signals representing interrogated information are applied by lead 36 to the source of information 32, for example.

A typical procedure for the preparation of the composition of the present invention follows:

The first step involves preparing a melt containing iron, nickel, silver, tin and optionally, molybdenum in the desired proportions by introducing the virgin metals of commercial grade into a high frequency induction furnace and heating until the melting point is reached.

Next, the molten mixture is poured into a graphite cylindrical mold, typically 0.5 inch in diameter. After cooling the mold, the resultant cylinder is removed therefrom and subjected to centerless grinding to remove surface defects. Thereafter, the cylinder is swaged, typically to 0.0350 inch and then annealed in a hydrogen atmosphere maintained at a temperature within the range of 900–1000° C.

Following, the material is again swaged, so reducing the diameter further to approximately 0.200 inch in diameter and annealed again as above. Then the material is cold swaged to approximately 0.100 inch in diameter and passed through a hydrogen atmosphere furnace at a temperature within the range of 900–1000° C. at a moderate rate, typically 3 feet per minute. Finally, the material is drawn to approximately 0.050 inch in diameter in a single block machine and then drawn to the ultimate desired diameter in a multiple die machine. The resultant metal wire is now ready for winding about the mounting cylinder 11 described in the figure or for fabrication into a memory storage device.

In the fabrication of compositions destined for use in devices of the described type, it is desirable that the compositions be produced by a series of processing steps terminating in a cold reduction of at least 90 percent in area, as, for example, by drawing. However, such processing is not required for all uses contemplated for the described compositions.

As noted above, compositions containing from 72.0–80.0 percent nickel, by weight, of the total composition, wherein the ratio of nickel to iron is within the approximate range of 3:1 to 7:1 are of interest in the present application. The percentage of silver, tin, and/or molybdenum to be added to the nickel iron mix is controlled by the nature of the characteristics desired, that is, coercive force and squareness ratio evidenced by the resultant material as well as the $H_n/H_c$ ratio. For the purposes described herein, from 0.25 to 2.0 percent tin and from 0.15 to 2.0 percent silver, by weight, of the total composition may be employed and from 0.0 to 5.0 percent, by weight, molybdenum, based on the weight of the total composition. Variations below or above the noted ranges adversely effect the $H_n/H_c$ ratio.

It may also be desirable to add percentages of the order of one percent, by weight, manganese or other additions for purposes known to those skilled in the art.

The following examples are given by way of illustration and not limitation unless otherwise noted in the appended claims.

*Example I*

A melt was prepared containing 79.73 parts nickel, 18.62 parts iron, 0.84 part silver, 0.31 part tin and 0.50 part manganese by adding the virgin metals of commercial grade to a high frequency induction furnace and heating until the mixture was molten. The mixture was then poured into a cylindrical graphite mold 0.5 inch in diameter and rolled to produce cylinders. Following, the cylinder was ground to remove surface defects, cold swaged to 0.350 inch and annealed in a hydrogen containing furnace maintained at 950° C. for 20 minutes at temperature. Next, the resultant composition was swaged to 0.200 inch and annealed at 950° C. as above and then cold swaged to 0.100 inch diameter. Then the composition was passed through a hydrogen containing furnace maintained at 950° C. at a rate of 3 feet per minute.

Thereafter, the composition was drawn to 0.050 inch in a single block machine and finally drawn to .0008 inch diameter in a multiple die machine. The resultant wire was then ready for use as magnetic medium 18 in the apparatus shown in the figure. The coercive force of the composition and the squareness ratio were 4 oersteds and 0.95, respectively.

*Example II*

The procedure of Example I was repeated employing a melt containing 77.56 parts nickel, 15.62 parts iron, 4.22 parts molybdenum, 0.32 part silver, 1.58 parts tin and 0.70 part manganese. The resultant composition evidenced a coercive force and squareness ratio of 6 oersteds and 0.95, respectively.

What is claimed is:

1. A composition of matter consisting essentially of 0.15–2.0 percent, by weight, silver, 0.25–2.0 percent, by weight, tin, up to 5.0 percent by weight molybdenum, 72.0–80.0 percent, by weight, nickel, remainder iron, wherein the ratio of nickel to iron is within the approximate range of 3:1 to 7:1.

2. A magnetic memory element comprising a magnetic conductor consisting essentially of 0.25–2.0 percent, by weight, silver, 0.15–2.0 percent, by weight, tin, up to 5.0 percent, by weight molybdenum 72.0–80.0 percent, by weight, nickel, remainder iron, wherein the ratio of nickel to iron is within the approximate range of 3:1 to 7:1.

3. A magnetic shift register storage device comprising an elongated magnetic element, means for establishing magnetic domains in said magnetic element and means for shifting said magnetic domains along said magnetic element, the improvement which comprises a magnetic element consisting essentially of 0.15–2.0 percent, by weight, silver, 0.25–2.0 percent, by weight, tin, up to 5.0 percent, by weight, molybdenum, 72.0–80.0 percent, by weight, nickel, remainder iron wherein the ratio of nickel to iron is within the approximate range of 3:1 to 7:1.

References Cited

UNITED STATES PATENTS

| | | | |
|---|---|---|---|
| 1,910,309 | 5/1933 | Smith et al. | 75—170 |
| 2,407,234 | 9/1946 | Guthrie et al. | 75—170 |

DAVID L. RECK, *Primary Examiner.*

RICHARD O. DEAN, *Examiner.*